Dec. 26, 1967  F. L. FAEHLING  3,359,885
VENT HOOD
Filed Jan. 17, 1966  2 Sheets-Sheet 1
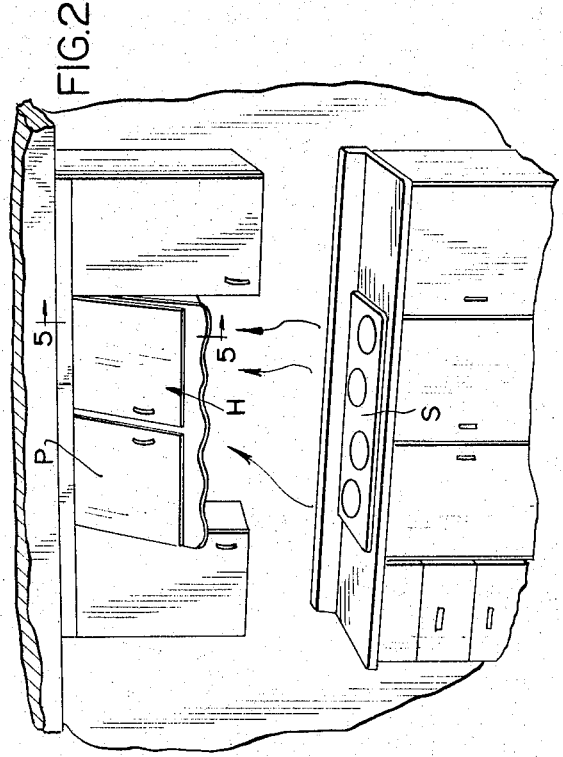
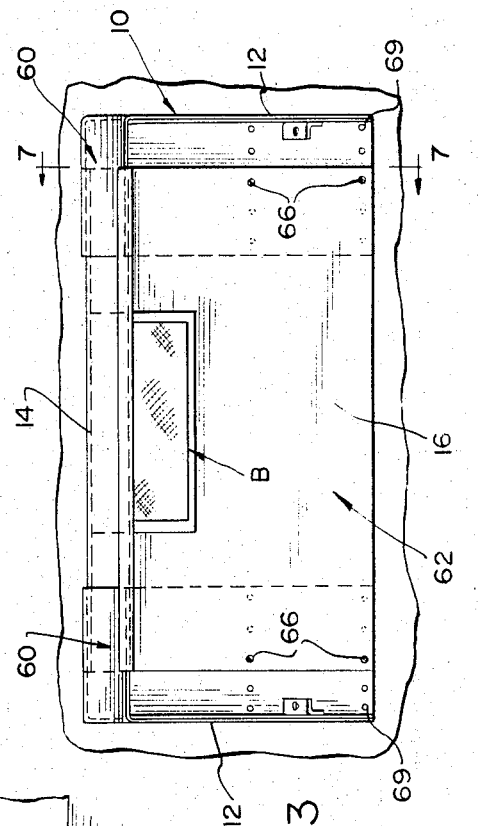
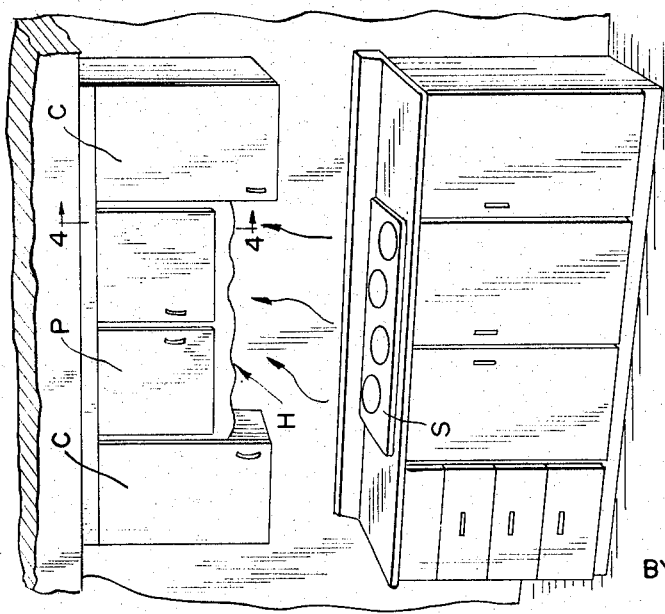
INVENTOR
FRANCIS L. FAEHLING
BY Hofgren, Wegner, Allen
Stillman & McCord
ATTORNEYS

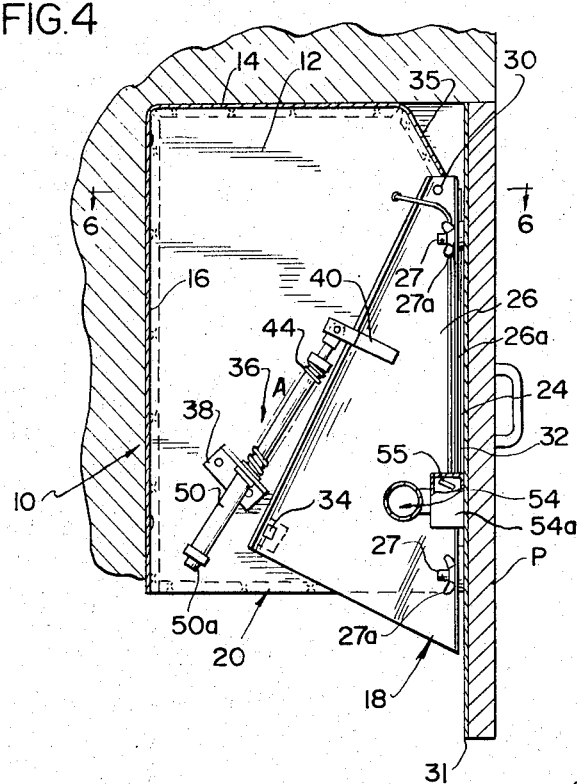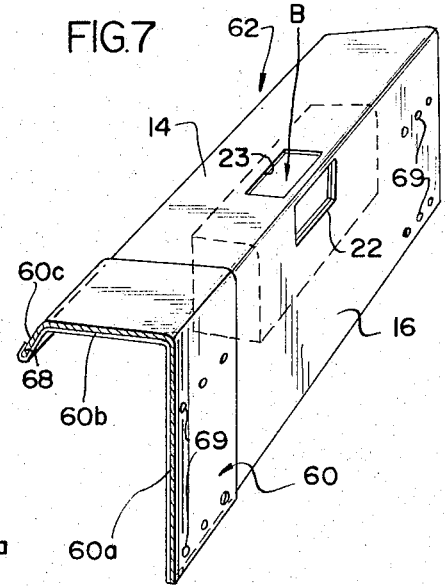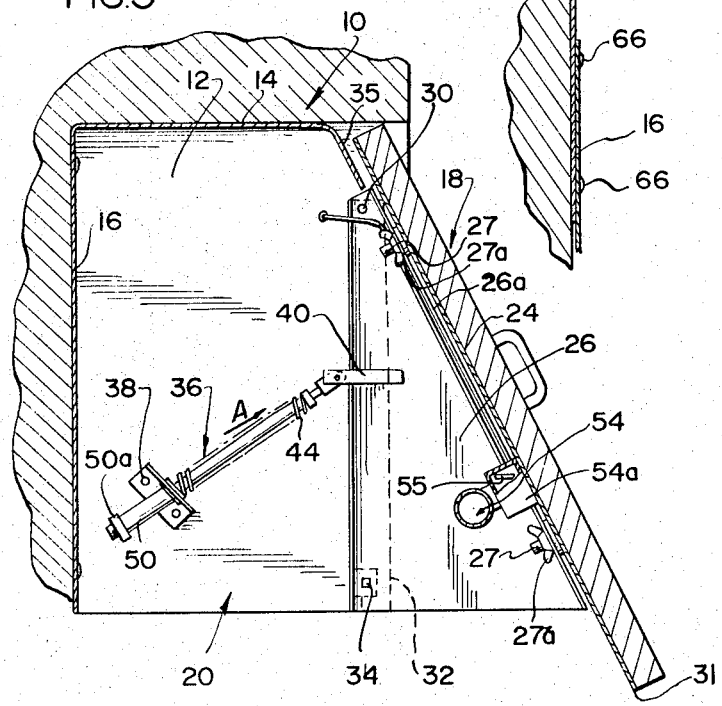

United States Patent Office 3,359,885
Patented Dec. 26, 1967

3,359,885
VENT HOOD
Francis L. Faehling, Wisconsin Rapids, Wis., assignor to Preway Inc., a corporation of Wisconsin
Filed Jan. 17, 1966, Ser. No. 520,973
1 Claim. (Cl. 98—115)

ABSTRACT OF THE DISCLOSURE

A ventilating hood for positioning in a kitchen cabinet arrangement above a subjacent cooking unit, which includes a hollow casing having an open bottom and blower means in the casing for drawing air up through the open bottom into the casing and discharging the air out through an outlet passage. The casing has a front wall assembly pivotally mounted adjacent its upper edge for movement from a normally closed vertical position flush with the adjacent kitchen cabinet to a tilted open position enlarging the open bottom of the casing. The hood includes a spring loaded linkage fixed at one end to the casing and the opposite end to the pivotal front wall assembly to hold the assembly in either of its vertical closed or tilted open positions.

---

It is the principal object of this invention to provide a new and improved decorative ventilating hood adapted for positioning between two spaced kitchen cabinet units and above a subjacent heating unit, or within a suitable recess beneath a kitchen cabinet or other like structure.

It is another object of this invention to provide a ventilating hood comprised of an open-bottom casing having a blower therein and an outlet passage therethrough, and a front wall assembly pivotally mounted along its upper edge for tilting movement away from the casing to provide a larger bottom trapping area to trap hot gases rising upwardly through the open bottom into the casing from a subjacent heating unit, the front wall assembly including a decorative front covering panel which matches the front faces of the surrounding kitchen cabinet units to provide a cleaner uniform look in the kitchen cabinet arrangement whereby the hood is completely concealed when in its closed inoperative position, yet having the same effect as a conventional hood when in its tilted open operative position.

It is still a further object of this invention to provide a ventilating hood of the character described wherein the casing is adjustable laterally to adapt the ventilating hood for kitchen cabinet openings of various widths.

It is yet another object of this invention to provide spring means to hold the front wall assembly in either its closed inoperative position or its tilted open operative position.

It is a further object of this invention to provide a ventilating hood of the character described including automatic actuating means for starting the blower when the hood is tilted to its open position.

Other objects and advantages of the invention will be apparent from the following specification and from the drawings, in which:

FIG. 1 is a perspective view illustrating the ventilating hood of this invention as positioned between two spaced kitchen cabinet units, and illustrating the front wall assembly and decorative cover panel of the hood in its closed position to completely conceal the ventilating hood;

FIG. 2 is a perspective view of the ventilating hood of FIG. 1 showing the tiltable front wall assembly and covering panel of the ventilating hood in its open tilted operative position;

FIG. 3 is a front elevational view looking into the ventilating hood of this invention with the tiltable front wall assembly and connecting spring means removed therefrom;

FIG. 4 is a vertical sectional view taken generally along the line 4—4 of FIG. 1 showing the tiltable front wall assembly of the hood in its closed position;

FIG. 5 is a vertical sectional view taken generally along the line 5—5 of FIG. 2 showing the tiltable front wall assembly in its tilted open position;

FIG. 6 is a horizontal fragmentary sectional view taken generally along the line 6—6 of FIG. 4; and FIG. 7 is a perspective view taken generally along the line 7—7 of FIG. 3 to illustrate the means for laterally adjusting the casing of the ventilating hood.

While an illustrative embodiment of the invention is shown in the drawings and will be described in detail herein, it should be understood that the present disclosure is to be considered as an exemplification of the principles of the invention and is not intended to limit the invention to the embodiment illustrated. The scope of the invention will be pointed out in the appended claims.

As seen in FIGS. 1 and 2, the ventilating hood, generally designated H, is illustrated as positioned between two spaced kitchen cabinet units C of a usual kitchen cabinet arrangement. The hood may be positioned in any suitable open-front, open-bottom recess between appropriately arranged kitchen cabinet units or other like structures. The hood is designed as an exhaust means for drawing hot gases, rising from a subjacent cooking surface S, through the open-bottom of the hood and discharging the gases out through appropriate conduit means extending from the hood through an adjacent cabinet, wall or ceiling. The ventilating hood is provided with a casing and a front wall assembly which (hereinafter described) is tiltable about its upper edge in order to tilt the front wall assembly away from the casing (FIG. 2) and beyond the front face of the surrounding kitchen cabinets C to provide a greater bottom trapping area for the gases rising from the subjacent cooking surface S. By providing the tiltable front wall assembly of the casing with a decorative panel P which matches the adjacent kitchen cabinet units, the hood can be completely concealed in its inoperative closed position (FIG. 1) to provide for cleaner lines and therefore a neater look in the kitchen arrangement, while providing an improved ventilating means in its tilted operative position (FIG. 2) having a greater trapping area and a greater height to more effectively draw the hot gases from the subjacent cooking surface S than is permitted in the conventional ventilating hoods presently used.

Referring to FIGS. 3 through 6, the ventilating hood construction of this invention includes a rectangular hollow casing 10 which includes parallel side walls 12, top wall 14, rear wall 16, a tiltable front wall assembly generally designated 18, and an open-bottom 20. As best seen in FIG. 7, an outlet or ventilating passage 22 is cut through the rear wall 16 of the casing. A blower unit, generally designated B, is mounted in the casing adjacent the outlet passage for drawing air upwardly from the heating surface S through the open-bottom 20 into the casing and discharging the air out through the outlet passage 22. As commonly known, a blower unit includes a casing, an inlet and a motor driven fan to draw air into the casing through its inlet and out through a passage such as the outlet passage 22. The outlet passage may be in communication with an appropriate outlet conduit extending away from the casing through an adjacent wall. A second outlet passage 23 is cut through the top wall 14 and may be in communication with an outlet conduit extending away from the casing through an adjacent ceiling or similar overhead structure. The two outlet passages 22 and 23 thus permit a choice to provide for easier installation, depending on the nature of the surrounding structures. The blower unit B may be removed and rotated 90° to blow air out either passage. The casing, including the side walls, top wall and rear wall may be easily formed of sheet metal.

The tiltable front wall assembly 18 is comprised of a generally rectangular flat sheet metal vertical front wall 24 having two triangularly shaped side wall extensions 26 secured thereto and extending rearwardly therefrom into the hollow casing closely adjacent and parallel to the side walls 12 of the casing. The side wall extensions 26, although secured to the front wall assembly 18, define extensions of the casing side walls 12. To facilitate securing the front wall to the side wall extensions, each extension may be provided with a flange 26a turned inwardly toward the opposite side wall and being provided with a plurality of appropriate openings through which a bolt 27, secured to the front wall 24, may extend so that a means such as a wing nut 27a may be screwed thereon to tightly secure the front wall 24 to the flanges 26a. The assembly is pivotally mounted near its upper edge at each end thereof to the side walls 12 of the casing by means of a rivet 30 (FIG. 6) extending through each of the casing side walls and the adjacent side wall extension 26 whereby the entire front wall assembly may be tilted from a closed inoperative position (FIG. 4) about rivets 30 to an open tilted operative position (FIG. 5). By so tilting the front wall assembly, the lower edge 31 thereof is swung away from the front edges 32 of the casing side walls 12, and the side wall extensions 26 are moved parallel to the respective side walls 12 to enlarge the open-bottom of the casing thereby providing a larger trapping area for hot gases rising from the subjacent heating surface. One or more nylon buttons 34 may be secured to the side wall extensions 26, between the side wall extensions and the casing side walls 12, to provide for smooth operation and protect the finishes on the respective walls during opening and closing of the front wall assembly, by preventing direct contact therebetween.

The top wall 14 of the casing is provided with a downwardly, forwardly angled lip 35 along the front edge thereof to accommodate portions of the front wall 24 (of the front wall assembly) which extend above the pivot point (rivet 30) of the front wall assembly and which will therefore tilt rearwardly toward the casing when the lower portions of the assembly are tilted away from the casing.

In order to completely conceal the ventilating hood (FIG. 1) the decorative front covering panel P (which matches the adjacent kitchen cabinet units C) may be secured to the front wall 24 of the front wall assembly. Obviously, the decorative panel could be secured directly to flanges 26a of the side wall extensions 26, but by providing the sheet metal front wall 24, the more porous decorative panel can be protected from the greasy and gritty particles rising from the subjacent heating surface. In addition, the sheet metal front wall 24 can be mounted to the side wall extensions 26 more easily than mounting the usually wooden decorative panel directly thereto.

An over center linkage, generally designated 36 (FIGS. 4 and 5), is pivotally mounted to at least one of the casing side walls 12 by means of an L-bracket 38 secured to the side wall 12. The L-bracket embraces one end of the linkage and maintains the same slightly spaced from the side wall 12. The other end of the linkage is pivotally mounted to the front wall extension 26 by means of a Z-shaped bracket 40. The mounting brackets are best illustrated in FIG. 6. The linkage is provided with a coil spring 44 which is maintained under constant compression, directing a force along the spring means in the direction of arrow A. Since the left end of the linkage is fixed to side wall 12, the direction of the spring's urging force will be governed by the position of the other end of the linkage which moves with the tiltable front wall assembly. It can thus be seen from FIGS. 4 and 5 that the linkage 36 can maintain the front wall assembly in either of its open or closed positions by directing the compression force of spring 44 to the right or to the left respectively of the pivot point (rivet 30) of the front wall assembly. The linkage is provided with an adjusting nut 50 which may be turned to adjust the tension in spring 44. The linkage is also provided with a threaded stop limit sleeve 50 which bears against bracket 38 and is provided with an integral nut 50a which can be adjusted to limit the outward movement of the front wall assembly. The open operative position of the front wall assembly is thus defined by the position of the stop limit sleeve 50, and the closed inoperative position of the assembly is defined by the abutment of the front wall 24 of the assembly against the front edge 32 of the casing side walls 12.

A lighting means, generally designated 54 and including a housing 54a, is secured to the rear face of the front wall 24. A mercury switch 55 is mounted in housing 54a and may be connected in an appropriate circuit (not shown) to the lighting means and/or the blower unit B. thus providing an automatic control switch. When the tiltable front wall assembly is in its closed position, as seen in FIG. 4, the mercury will be at one end of the switch bulb breaking the circuit to the blower unit and lighting means. As the assembly is tilted outwardly, the mercury will flow to the other end of the switch bulb closing the circuit and automatically actuating the blower unit and lighting means.

Since the spacing between the cabinet units C is not uniform in every kitchen cabinet arrangemet, a means is provided and is illustrated in FIGS. 3, 6 and 7 whereby the hollow casing 10 may be laterally adjusted to vary its width in accordance with the width of the particular opening between the kitchen cabinet units. Referring to FIG. 6, the width of the front wall 24 of the front wall assembly may easily be varied by providing two overlapping metal plates having a series of complementary apertures or openings 56 whereby the width of the front wall can be determined by the amount of overlap between the plates and the selected aperture 56 to which a rivet 58 may be inserted to secure the overlapping plates together. This same principle is employed to adjust the width of the top wall 14 and rear wall 16 of the casing, and is best illustrated in FIGS. 3 and 7. An integral flange, generally designated 60 (FIG. 7), extends inwardly from the rear edge of the side wall 12 (as at 60a), from the top edge of the side wall (as at 60b) and from the outer edge of the downwardly angled lip of the top wall (as at 60c). This integral inwardly extending flange overlaps an intermediate generally L-shaped section or body portion of the casing, generally designaaed 62, as illustrated in FIG. 7. A plurality of openings 64 are provided through the flange 60 and the intermediate section 62 and are in alignment so that the width of the casing may be varied by selecting the amount of overlap between the intermediate section 62 and the integral flange 60 and by inserting rivets 66 through the selected openings to fix the intermediate section 62 in a desired overlapping relation to the flange 60. The intermediate section is provided with a groove 68 formed integrally therewith along the front edge thereof to further facilitate adjusting the width of the casing by sliding the forward edge of the downwardly angle lip of the flange into the groove along the front edge of the intermediate section. It can be seen that the width of the casing 10 and the width of the front wall 24 of the front wall assembly can easily be adjusted by selecting the amount of overlap between the respective overlapping portions thereof.

Thus, it can be seen that I have provided a new and improved decorative ventilating hood adapted for positioning between any two kitchen cabinet units having various spacings, the hood being provided with a front wall assembly pivotally mounted along its upper edge to tilt the wall assembly away from the casing to provide a larger bottom trapping area for drawing air upwardly into the casing from a subjacent heating surface, in combination with means for automatically operating the blower unit disposed therein, and in combination with a linkage for maintaining the hood in either of its open operative or closed inoperative positions, respectively.

I claim:

A ventilating hood construction for positioning in a recess in a kitchen cabinet arrangement above a subjacent cooking unit, comprising: a hollow casing including spaced generally vertical side walls and an open bottom; an outlet passage through said casing; blower means mounted in said casing for drawing air up through said open bottom into said casing and discharging the air out through said outlet passage; a front wall assembly including a vertical, flat thin structurally rigid front wall having an upper generally horizontal edge, side wall extensions extending perpendicular to said front wall into said hollow casing closely adjacent and parallel to the side walls of said casing, each of said side wall extensions having an inwardly turned flange underlying a portion of said front wall and secured thereto; means to pivotally mount said front wall assembly adjacent the upper edge of said vertical front wall to said casing for movement about a fixed pivot axis from a normally closed generally vertical position with said front wall flush with the adjacent kitchen cabinets to an open position with said front wall tilted and said side wall extensions protruding from within said casing enlarging the open bottom of said casing to provide a large trapping area to trap the hot gases rising upwardly from said subjacent cooking unit; a decorative front covering panel secured to said sheet metal front wall whereby said front wall protects said panel from hot gases rising from said subjacent cooking unit, and because of said biased pivot axis functions in all positions to block from view the structure disposed to the rear of the decorative panel; and a linkage having a longitudinal coil spring, said linkage having one end fixed to said casing and an opposite end secured to and movable with said front wall assembly, said linkage including means to maintain the coil spring under constant compression to direct a force from said one end thereof towards said opposite end and being adapted to direct said force to either side of the means pivotally mounting said front wall assembly to the casing to hold said pivotable front wall assembly in either of its vertical closed or tilted open positions.

References Cited
UNITED STATES PATENTS

| | | | |
|---|---|---|---|
| 2,809,575 | 10/1957 | Floyd | 98—115 |
| 3,031,946 | 5/1962 | Watt et al. | 98—115 |
| 3,065,687 | 11/1962 | Graswich et al. | 98—115 |
| 3,087,411 | 4/1963 | Spear et al. | 98—115 |
| 3,098,423 | 7/1963 | Giannini | 98—115 |
| 3,109,358 | 11/1963 | Meyer | 98—115 |

FOREIGN PATENTS 1,088,458  9/1954  France.

ROBERT A. O'LEARY, *Primary Examiner.*

M. A. ANTONAKAS, *Assistant Examiner.*